United States Patent [19]
Fukaya et al.

[11] Patent Number: 6,001,758
[45] Date of Patent: Dec. 14, 1999

[54] HARD AND TOUGH SINTERED BODY

[75] Inventors: Tomohiro Fukaya; Tetsuo Nakai; Junichi Shiraishi; Satoru Kukino; Shinya Uesaka, all of Hyogo, Japan

[73] Assignee: Sumitomo Electric Industries, Ltd., Osaka, Japan

[21] Appl. No.: 08/960,773

[22] Filed: Oct. 30, 1997

[30] Foreign Application Priority Data

Oct. 31, 1996 [JP] Japan ................................ 8-290359

[51] Int. Cl.⁶ .............................................. C04B 35/5835
[52] U.S. Cl. ........................ 501/96.4; 501/87; 501/96.1; 501/98.6
[58] Field of Search ........................ 501/96.4, 87, 96.1, 501/96.3, 98.6

[56] References Cited

U.S. PATENT DOCUMENTS

| | | |
|---|---|---|
| 5,106,392 | 4/1992 | Slutz et al. . |
| 5,200,372 | 4/1993 | Kuroyama et al. ............... 501/96.4 |
| 5,466,642 | 11/1995 | Tajima et al. ..................... 501/96.4 |
| 5,536,485 | 7/1996 | Kume et al. . |
| 5,569,862 | 10/1996 | Kuroyama et al. ............... 501/96.4 |
| 5,604,164 | 2/1997 | Montgomery et al. ........... 501/96.4 |
| 5,639,285 | 6/1997 | Yao et al. ......................... 501/96.4 |

FOREIGN PATENT DOCUMENTS

| | | |
|---|---|---|
| 49-42710 | 4/1974 | Japan . |
| 51-4207 | 1/1976 | Japan . |
| 52-43846 | 11/1977 | Japan . |
| 55-031517 | 5/1980 | Japan . |
| 55-126581 | 9/1980 | Japan . |
| 56-156738 | 3/1981 | Japan . |
| 57-3631 | 1/1982 | Japan . |
| 58-60678 | 4/1983 | Japan . |
| 58-058247 | 6/1983 | Japan . |
| 5-186844 | 7/1993 | Japan . |
| 96/36677 | 11/1996 | WIPO . |

*Primary Examiner*—Karl Group
*Attorney, Agent, or Firm*—W. F. Fasse; W. G. Fasse

[57] ABSTRACT

A sintered body consists of high-pressure phase boron nitride, a residual binder phase and an unavoidable impurity, and contains high-pressure phase boron nitride powder which is previously coated with a binder before sintering. The coating binder consists of an element belonging to the group 4a, 5a or 6a of the periodic table or the like, and has an average thickness of 5 to 300 nm. Binder powder other than the coating binder consists of an element belonging to the group 4a, 5a or 6a of the periodic table or the like, and a contact ratio of high-pressure phase boron nitride particles in surface-to-surface contact with each other is at least 20% and less than 50%. The resulting high-pressure phase boron nitride-based hard and tough sintered body for a cutting tool is improved in wear resistance and chipping resistance.

18 Claims, 1 Drawing Sheet

HARD AND TOUGH SINTERED BODY

BACKGROUND OF THE INVENTION

1. Field of the Invention

The present invention generally relates to a sintered body, and more specifically, it relates to a high-pressure phase boron nitride-based hard and tough sintered body for a cutting tool such as a milling cutter or an end mill, which is improved in wear resistance and chipping resistance.

2. Description of the Background Art

High-pressure phase boron nitride represented by cBN (cubic boron nitride) and/or WBN (wurtzite boron nitride) is the next hardest substance after diamond and has lower reactivity with a ferrous material as compared with diamond. Thus, cBN sintered bodies are applied to various cutting tools.

A hard and tough material is awaited for application to not only a cutting tool but also a wear-resistant component such as a wear-resistant component provided on a sliding part or a wear-resistant component employed for a defensive wall, for example.

Cubic boron nitride is hard to sinter, similarly to diamond, and stable under a high pressure. Therefore, limited sintering conditions of at least 2000° C. and at least 8 GPa are required for sintering only cBN particles. The cBN particles are not bonded to each other under industrial sintering conditions of about 1400° C. and 4 GPa.

In a sintered body consisting of cBN particles and a binder phase, on the other hand, reaction is caused in grain boundaries between the cBN particles and the binder phase. Thus, a cBN sintered body which is excellent in holding power for cBN particles can be obtained.

However, a general cBN sintered body is obtained by mixing cBN powder with binder powder and sintering the mixture, and the cBN particles are not completely homogeneously mixed with the binder. In a partial region of the sintered body, therefore, cBN particles are directly in contact with each other or in contact with a binder phase that hardly reacts with the cBN particles, to result in an unsintered part. Thus, the sintered body is inferior in wear resistance or chipping resistance.

Japanese Patent Laying-Open Nos. 58-58247 (1983), 58-60678 (1983) and 5-186844 (1993) propose typical means for solving the aforementioned problem.

Japanese Patent Laying-Open No. 58-58247 discloses a tough boron nitride-based superhigh pressure sintered material for a cutting or wear-resistant tool which is composed of cubic boron nitride and a binder phase consisting of a boride and a carbide of at least one of Ti, Hf, Zr and Mo so that a layer of the boride having an average thickness of 0.1 to 2 $\mu$m encloses the cubic boron nitride.

Japanese Patent Laying-Open No. 58-60678 discloses a tough boron nitride-based superhigh pressure sintered material for a cutting or wear-resistant tool which is composed of cubic boron nitride and a binder phase consisting of a nitride and a carbide of at least one of Ti, Hf and Si so that a layer of a nitride having an average thickness of 0.1 to 2 $\mu$m encloses the cubic boron nitride.

Japanese Patent Laying-Open No. 5-186844 discloses a tough boron nitride-based superhigh pressure sintered material for a cutting or wear-resistant tool which is composed of cubic boron nitride and/or wurtzite boron nitride and a binder phase consisting of at least one of the metals belonging to the groups 4a, 5a and 6a of the periodic table, carbides, nitrides, oxides and borides of Al, Si, Fe, Ni and Co, an oxide and a nitride of a rare earth metal and a solid solution thereof, and Fe, Ni and Co so that a layer of at least one of nitrides and borides of Ti, Hf, Zr, Mo, Al and Si and solid solutions thereof having an average thickness of 0.5 to 90 nm encloses the cubic boron nitride and/or the wurtzite boron nitride.

The high-pressure phase boron nitride-based sintered bodies described in the aforementioned Japanese Patent Laying-Open Publications are obtained by coating high-pressure phase boron nitride particles with binders and sintering the same. Thus, these sintered bodies can reduce the occurrence of unsintered parts, and are improved in wear resistance and chipping resistance.

In each of these sintered bodies, however, the coating binder is made of ceramic which is a brittle material, and this ceramic is so thermally and chemically stable that it causes insufficient reaction with the high-pressure phase boron nitride to result in insufficient adhesion strength between the coating binder and the high-pressure phase boron nitride particles. Thus, the coating binder is readily chipped and separated from the high-pressure phase boron nitride particles when the coated particles are mixed with another binder or pressurized by a superhigh pressure sintering device or a hot press. In the high-pressure phase boron nitride-based sintered body employing such powder materials, the high-pressure phase boron nitride particles are frequently in contact with each other, which leads to sufficient homogenization of the sintered body structure.

SUMMARY OF THE INVENTION

The present invention has been proposed in order to solve the aforementioned problems, and an object thereof is to provide a high-pressure phase boron-nitride based hard and tough sintered body for a cutting tool such as a milling cutter or an end mill, which is improved in wear resistance and chipping resistance.

The hard and tough sintered body according to the present invention consists of high-pressure phase boron nitride, a residual binder phase and an unavoidable impurity, and contains high-pressure phase boron nitride powder which has been previously coated with a binder before sintering. The coating binder is made of at least one material selected from a group of elements belonging to the groups 4a, 5a and 6a of the periodic table, Al, Si, an iron family metal and intermetallic compounds thereof, to coat the boron nitride powder in an average thickness of 5 to 300 nm. The sintered body further contains a binder powder other than the coating binder, that consists of at least one material selected from a group of elements belonging to the groups 4a, 5a and 6a of the periodic table, a nitride, a carbide, a boride and an oxide of Si and solid solutions thereof, an Al compound, Al and an iron family metal. The number of particles (hereinafter referred to as a contact ratio of high-pressure phase boron nitride) which are in contact with other high-pressure phase boron nitride particles in an arbitrary region of the sintered body having at least 100 high-pressure phase boron nitride particles forming the same is at least 20% and less than 50%.

According to a preferred embodiment of the present invention, the boron nitride comprises cubic boron nitride particles that have been coated with a coating binder which is an intermetallic compound of Al and at least one material selected from the group of Ti, Zr and Hf, and the sintered body is obtained by infiltrating at least one material selected from a group of Al, Co, Ni, W and WC, which is the binder powder other than the coating binder, into the coated cubic boron nitride particles, and sintering the same.

It is also preferable that the aforementioned high-pressure phase boron nitride is cubic boron nitride, the aforementioned coating binder is an intermetallic compound of Al and at least one material selected from the group of Ti, Zr and Hf, and the aforementioned binder powder consists of at least one material selected from a group of TiN, ZrN, HfN, TiC, ZrC, HfC and TiAlN and solid solutions thereof, Al and an Al compound.

In this case, reactivity with the cubic boron nitride is further effectively improved due to interaction of Ti, Zr and/or Hf as compared with the case of coating the powder simply with Al.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
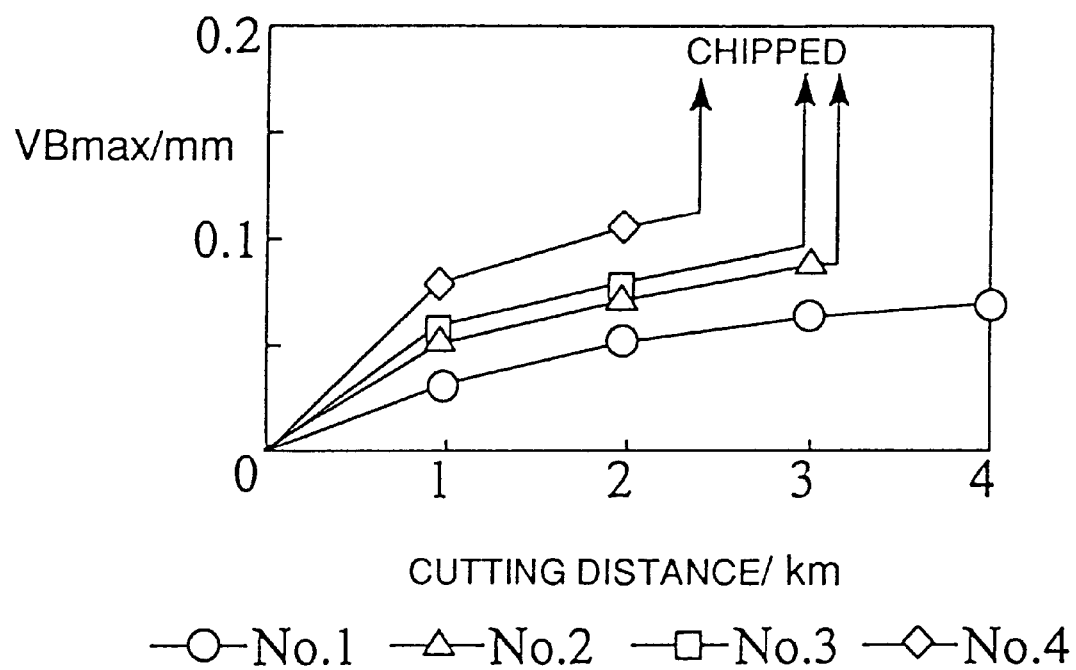
FIG. 1 illustrates the results of a cutting test.

A sintered body according to the present invention can be obtained by sintering high-pressure phase boron nitride powder whose surface has been previously coated with a binder by chemical vapor deposition (CVD), physical vapor deposition (PVD), electroless plating or mechanical mixing such as mechanofusion, for example, in a conventional plasma sintering device, a hot press or a superhigh pressure sintering device. A binder other than the coating binder can be infiltrated in situ during sintering, or mixed into the binder-coated high-pressure phase boron nitride powder by a conventional powder metallurgical method represented by a ball mill method or the like, to be thereafter sintered in the aforementioned method.

Examples of the present invention are now described with concrete numerical values.

EXAMPLE 1

Cubic boron nitride powder materials having mean particle diameters of 15 μm were wet-mixed with various intermetallic compound powder materials in a planetary mill, in a mixed solution of PEG (polyethylene glycol), PAMA (polyalkyl methacrylate) and ethyl alcohol, with subsequent drying.

The dried mixed powder materials were vacuum-heated in a vacuum furnace under conditions of $10^{-5}$ Torr and 1200° C. for one hour. After the heat treatment, the powder surfaces were observed with an EPMA, to find that the cBN powder materials were homogeneously coated with the intermetallic compounds.

Then, the coated cBN powder materials and binder powder materials were charged into Mo capsules provided with Al plates, and sintered in a belt-type superhigh pressure device under conditions of 5.2 GPa and 1480° C. for 20 minutes with infiltration of an Al solution. For the purpose of comparison, a cBN sintered body was prepared from starting materials of the same composition as the above but without being coated by a binder.

After the sintering, the Mo capsules were recovered and removed by grinding, and the compositions and structures of the sintered bodies were analyzed by X-ray analysis, with an SEM and a TEM, and by EXDX and FE-AES with a beam diameter of φ45 nm. Contact ratios of cBN particles were determined from surface images analyzed by FE-AES. Table 1 shows the details of the prepared sintered bodies.

TABLE 1

| | | Starting Material Coated cBN Powder | | | Sintered Body | Contact Ratio of |
|---|---|---|---|---|---|---|
| No. | | Component of Coating Binder | Average Thickness of Coating Binder (nm) | cBN Content (vol %) | Identified Component | cBN Particles (%) |
| x | 1 | Al | 3 | 92 | cBN,AlN,AlB2 | 53 |
| Inventive | 2 | Al | 5 | 90 | cBN,AlN,AlB2 | 49 |
| Inventive | 3 | Al | 295 | 88 | cBN,AlN,AlB2 | 48 |
| x | 4 | Al | 310 | 87 | cBN,AlN,AlB2 | 48 |
| Inventive | 5 | Ti | 25 | 88 | cBN,AlN,AlB2,TiN,TiB2 | 48 |
| Inventive | 6 | Zr | 295 | 88 | cBN,AlN,AlB2,ZrN,ZrB2 | 48 |
| Inventive | 7 | Hf | 295 | 88 | cBN,AlN,AlB2,HfN,HfB2 | 48 |
| Inventive | 8 | W | 295 | 88 | cBN,AlN,AlB2,WB2,WN | 48 |
| Inventive | 9 | TiAl | 295 | 88 | cBN,AlN,AlB2,TiN,TiB2 | 48 |
| Inventive | 10 | ZrAl | 295 | 88 | cBN,AlN,AlB2,ZrN,ZrB2 | 48 |
| Inventive | 11 | HfAl | 295 | 88 | cBN,AlN,AlB2,HfN,HfB2 | 48 |
| Inventive | 12 | TiAl3 | 295 | 88 | cBN,AlN,AlB2,TiN,TiB2 | 48 |
| Inventive | 13 | TiSi2 | 295 | 88 | cBN,AlN,AlB2,TiN,TiB2, Si3N4 | 48 |
| Inventive | 14 | Co | 295 | 88 | cBN,AlN,AlB2,CoB | 48 |
| Inventive | 15 | CoAl | 295 | 88 | cBN,AlN,AlB2,CoB | 48 |
| Inventive | 16 | NiAl | 295 | 88 | cBN,AlN,AlB2,NiB | 48 |
| Comparative | 17 | — | — | 88 | cBN,AlN,AlB2 | 93 | x: cBN sintered body employing coated cBN particles out of the inventive scope
Inventive: cBN sintered body employing coated cBN particles within the inventive scope
Comparative: cBN sintered body employing cBN particles not coated with binder, prepared for the purpose of comparison Test pieces of 6 mm in length, 3 mm in width and 0.5 to 0.55 mm in thickness were cut out from the sintered bodies, for measuring transverse rupture strength (strength) under 4 mm span conditions. Table 2 shows the strength results.

Further, sintered body tips for cutting (SNMG 120808 under ISO standards) were prepared for performing a cutting test under the following conditions:

Workpiece: round bar of SKH 51 with hardness (HRC) of 60

Cutting Speed (V): 80 m/min.

Depth of Cut: 0.3 mm

Feed Rate: 0.15 mm/rev.

Type: wet

Cutting Time: 30 min.

Table 2 shows the results of this cutting test.

TABLE 2

| No. | | Transverse Rupture Strength (kgf/mm2) | Flank Wear Width (mm) |
|---|---|---|---|
| x | 1 | 85 | chipped in 25 min. |
| Inventive | 2 | 95 | 0.045 |
| Inventive | 3 | 95 | 0.044 |
| x | 4 | 90 | chipped in 28 min. |
| Inventive | 5 | 95 | 0.043 |
| Inventive | 6 | 95 | 0.043 |
| Inventive | 7 | 95 | 0.043 |
| Inventive | 8 | 95 | 0.047 |
| Inventive | 9 | 100 | 0.042 |
| Inventive | 10 | 100 | 0.042 |
| Inventive | 11 | 100 | 0.042 |
| Inventive | 12 | 100 | 0.042 |
| Inventive | 13 | 100 | 0.042 |
| Inventive | 14 | 95 | 0.042 |
| Inventive | 15 | 100 | 0.042 |

TABLE 2-continued

| No. | | Transverse Rupture Strength (kgf/mm2) | Flank Wear Width (mm) |
|---|---|---|---|
| Inventive | 16 | 100 | 0.042 |
| Comparative | 17 | 65 | chipped in 10 min. |

EXAMPLE 2

High-pressure phase boron nitride powder materials having mean particle diameters of 0.5 μm were coated with various metals, intermetallic compounds, AlB$_2$, TiB$_2$ and AlN as shown in Table 3 in an RF sputtering PVD device. At this time, the degree of vacuum in a furnace was set at $10^{-4}$ Torr, thereafter Ar gas was introduced to maintain the atmosphere at $10^{-3}$ Torr, and the furnace was heated to 300° C., for coating the materials under PVD conditions of power of 5 KW and frequency of 15 MHz for 10 hours.

Then, mixed powder materials which were prepared by blending the coated high-pressure phase boron nitride powder materials and binder powder materials to attain the structures shown in Table 3 were ball-milled and thereafter sintered in a belt-type superhigh pressure device similarly to Example 1 under conditions of 4.5 GPa and 1300° C. for 10 minutes, with no infiltration. For the purpose of comparison, some cBN sintered bodies were prepared from starting materials that were not coated with no binders.

Table 3 shows the compositions and structures of the prepared sintered bodies analyzed similarly to Example 1.

TABLE 3

| | | Starting Material | | | | | Sintered Body | |
|---|---|---|---|---|---|---|---|---|
| | | Coated High-Pressure Phase Boron Nitride Powder | | | | | | Contact Ratio of |
| No. | | High-Pressure Phase Boron Nitride (WBN or cBN) | Component of Coating Binder | Average Thickness of Coating Binder (nm) | BN Content (vol %) | Binder Powder Weight Ratio of Components (wt %) | Identified Component | High-Pressure Phase Boron Nitride (WBN or cBN) Particles |
| Inventive | 1 | WBN | Ti | 100 | 60 | TiN-85, Al-15 | cBN, WBN, TiN, TiB2, AlB2, AlN | 26 |
| Inventive | 2 | cBN | Ti | 100 | 60 | TiN-85, Al-15 | cBN, TiN, TiB2, AlB2, AlN | 27 |
| Inventive | 3 | cBN | Zr | 100 | 60 | TiN-85, Al-15 | cBN, TiN, TiB2, ZrB2, AlB2, ZrN, AlN | 27 |
| Inventive | 4 | cBN | Al | 100 | 60 | TiN-85, Al-15 | cBN, TiN, TiB2, AlB2, AlN | 28 |
| x | 5 | cBN | Al | 3 | 60 | TiN-85, Al-15 | cBN, TiN, TiB2, AlB2, AlN | 59 |
| Inventive | 6 | cBN | Hf | 100 | 60 | TiN-85, Al-15 | cBN, TiN, TiB2, HfB2, AlB2, HfN, AlN | 18 |
| Inventive | 7 | cBN | TiNbN | 100 | 60 | TiN-85, Al-15 | cBN, TiN, TiB2, AlB2, AlN, NbB2 | 29 |
| Inventive | 8 | cBN | Zr3Al | 100 | 20 | TiAlN-85, Al-15 | cBN, TiN, TiAlN, TiB2, ZrB2, AlB2, ZrN, AlN | 29 |
| Inventive | 9 | cBN | Zr3Al | 100 | 60 | TiN-85, Al-15 | cBN, TiN, TiB2, ZrB2, AlB2, ZrN, AlN | 20 |
| Inventive | 10 | cBN | Zr3Al | 100 | 60 | TiC-75, Al2O3-10, Al-15 | cBN, TiC, TiB2, ZrB2, AlB2, ZrN, AlN, Al2O3 | 29 |
| Inventive | 11 | cBN | Zr3Al | 100 | 60 | TiN-100 | cBN, TiN, TiB2, ZrB2, AlB2, ZrN, AlN | 29 |
| Inventive | 12 | cBN | Zr3Al | 100 | 60 | TiHfC-85, Al-15 | cBN, TiHfC, TiB2, ZrB2, AlB2, ZrN, AlN | 29 |
| Inventive | 13 | cBN | Zr3Al | 100 | 80 | TiN-85, Al-15 | cBN, TiN, TiB2, ZrB2, AlB2, ZrN, AlN | 22 |
| Inventive | 14 | cBN | Hf3Al2 | 100 | 60 | TiN-85, Al-15 | cBN, HfN, TiB2, HfB2, AlB2, HfrN, AlN | 21 |
| Comparative | 15 | cBN | AlB2 | 100 | 60 | TiN-85, Al-15 | cBN, TiN, TiB2, AlB2, AlN | 54 |
| Comparative | 16 | cBN | TiB2 | 100 | 60 | TiN-85, Al-15 | cBN, TiN, TiB2, AlB2, AlN | 55 |

TABLE 3-continued

| | Starting Material | | | | | | Sintered Body |
| --- | --- | --- | --- | --- | --- | --- | --- |
| | Coated High-Pressure Phase Boron Nitride Powder | | | | | | Contact Ratio of |
| No. | High-Pressure Phase Boron Nitride (WBN or cBN) | Component of Coating Binder | Average Thickness of Coating Binder (nm) | BN Content (vol %) | Binder Powder Weight Ratio of Components (wt %) | Identified Component | High-Pressure Phase Boron Nitride (WBN or cBN) Particles |
| Comparative 17 | cBN | AlN | 100 | 60 | TiN-85, Al-15 | cBN, TiN, TiB2, AlB2, AlN | 51 |
| Comparative 18 | cBN | — | 100 | 60 | TiN-85, Al-15 | cBN, TiN, TiB2, AlB2, AlN | 65 |

Similarly to Example 1, transverse rupture strength (strength) was measured and a cutting test was made under the following conditions:

Tip: SNGN 120808
Workpiece: case-hardened SCM 420H with hardness (HRC) of 60 having V-shaped grooves at six locations on its outer periphery
Cutting Speed (V): 150 m/min.
Depth of Cut: 0.2 mm
Feed Rate: 0.1 mm/rev.
Type: dry Table 4 shows the results of the cutting test.

TABLE 4

| No. | | Transverse Rupture Strength (kfg/mm2) | Number of Impacts up to Chipping | Flank Wear Width with 50,000 Impacts |
| --- | --- | --- | --- | --- |
| Inventive | 1 | 140 | 77,000 | 0.122 |
| Inventive | 2 | 130 | 70,000 | 0.101 |
| Inventive | 3 | 135 | 79,000 | 0.107 |
| Inventive | 4 | 140 | 81,000 | 0.103 |
| x | 5 | 105 | 49,000 | chipped |
| Inventive | 6 | 133 | 79,000 | 0.097 |
| Inventive | 7 | 130 | 78,000 | 0.111 |
| Inventive | 8 | 125 | 69,000 | 0.096 |
| Inventive | 9 | 140 | 83,000 | 0.129 |
| Inventive | 10 | 118 | 62,000 | 0.085 |
| Inventive | 11 | 125 | 72,000 | 0.121 |
| Inventive | 12 | 125 | 79,000 | 0.102 |
| Inventive | 13 | 150 | 95,000 | 0.149 |
| Inventive | 14 | 125 | 72,000 | 0.098 |
| Comparative | 15 | 115 | 54,000 | 0.119 |
| Comparative | 16 | 113 | 52,000 | 0.128 |
| Comparative | 17 | 110 | 47,000 | chipped |
| Comparative | 18 | 100 | 29,000 | chipped |

EXAMPLE 3

Cubic boron nitride powder materials having mean particle diameters of 10 μm were coated with Al through an RF sputtering PVD device. At this time, the degree of vacuum in a vacuum furnace was set at $10^{-4}$ Torr, Ar gas was introduced to maintain the atmosphere at $10^{-3}$ Torr, and the furnace was heated to 200° C., for coating the materials under PVD conditions of power of 5 KW and a frequency of 12 MHz for 300 minutes.

After the mixed powder materials were recovered, the powder surfaces were observed with a TEM, to find that the cBN powder materials were homogeneously coated with Al in average layer thicknesses of 150 nm.

Then, the cBN powder materials coated with binders were charged into Mo capsules provided with Al plates, and sintered in a belt-type superhigh pressure device under conditions of 4.8 GPa and 1450° C. for 15 minutes. For the purpose of comparison, cBN sintered bodies were prepared from starting materials of the same composition as the above but without being coated by a binder.

After the sintering, the Mo capsules were recovered and removed by grinding, and the compositions and structures of the sintered bodies were analyzed by X-ray analysis, with an ICP and a TEM, and by AES. Table 5 shows the details of the prepared sintered bodies.

TABLE 5

| No. | | Mean Particle Diameter of cBN (μm) | cBN content (vol %) | cBN Contact Ratio (%) | Identified Component |
| --- | --- | --- | --- | --- | --- |
| 1 | Inventive | 15 | 87 | 40 | cBN,AlN,AlB$_2$ |
| 2 | Comparative | 15 | 87 | 82 | cBN,AlN,AlB$_2$ |
| 3 | Comparative | 15 | 88 | 82 | cBN,AlN,AlB$_2$ |
| 4 | Comparative | 3 | 85 | 85 | cBN,AlN,W$_2$Co$_{21}$B$_6$, W$_3$Co$_3$B,WCo |

Inventive: cBN sintered body employing coated cBN particles within the inventive scope
Comparative No. 2: cBN sintered body employing cBN particles not coated with a binder prepared for the purpose of comparison
Comparative No. 3: commercially available cBN sintered body
Comparative No. 4: commercially available cBN sintered body For the purpose of comparison, commercially available cBN sintered bodies were also investigated. Then, rectangular test pieces of 6 mm in length, 3 mm in width and 0.4 to 0.45 mm in thickness were prepared from these sintered bodies and dissolved in fluoronitric acid prepared by mixing 40 ml of double-diluted nitric acid having a concentration of 60 to 65% and 10 ml of hydrofluoric acid having a concentration of 45 to 50% with each other in a closed vessel at 140° C. for 3 hours. Thereafter the transverse rupture strength was measured under a 4 mm span condition. The transverse rupture strength was also measured before the dissolution. Table 6 shows the results.

TABLE 6

| No. | | Transverse Rupture Strength before Dissolution (kgf/mm$^2$) | Transverse Rupture Strength after Dissolution (kgf/mm$^2$) |
| --- | --- | --- | --- |
| 1 | Inventive | 130 | fell to powdery pieces to allow no measurement of transverse rupture strength |
| 2 | Comparative | 110 | 15 |
| 3 | Comparative | 100 | 10 |
| 4 | Comparative | 120 | 20 |

Further, sintered body tips for cutting (SNMG 120812 under ISO standards) having rectangular major surfaces were formed and subjected to a cutting test under the following conditions:

Workpiece: round bar of FCD 450 with hardness (HRB) of 180 having two V-shaped grooves at two locations on its outer periphery Cutting Speed (V): 200 m/min.
Depth of Cut: 0.5 mm
Feed Rate: 0.2 mm/rev.
Type: wet FIG. 1 shows the results of the cutting test.

Only the inventive cBN sintered body fell to pieces after the dissolution, while the remaining cBN sintered bodies maintained sufficient strength (transverse rupture strength) for handling.

It is inferred that fluoronitric acid capable of dissolving components other than cBN was not able to completely infiltrate into the comparative sintered bodies containing cBN particles which were directly in contact with each other.

In other words, it is inferred that the inventive sintered body containing cBN particles whose outer peripheries were covered with binder layer components dissolved in fluoronitric acid fell into powdery pieces upon dissolution.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hard and tough sintered body consisting of:
   a boron nitride phase comprising boron nitride particles including at least one of cubic boron nitride and wurtzite boron nitride making up from 80 vol. % to 99.9 vol. % of said sintered body,
   a residual binder phase comprising a coating binder that respectively at least partially coats said boron nitride particles, and an additional binder other than said coating binder, and
   at least one unavoidable impurity;
   wherein said coating binder consists of at least one material selected from among a first group consisting of elements belonging to the groups 4a, 5a and 6a of the periodic table, Al, Si and an iron family element, and a second group consisting of intermetallic compounds of at least one element selected from said first group,
   wherein said coating binder respectively forms a coating on said boron nitride particles, with said coating having an average thickness of 5 to 300 nm,
   wherein said additional binder consists of at least one material selected from a third group consisting of:
   a) elements belonging to the groups 4a, 5a and 6a of the periodic table and Si,
   b) a nitride, a carbide, a boride and an oxide of said elements belonging to the groups 4a, 5a and 6a of the periodic table and Si,
   c) solid solutions of at least one of said nitride, said carbide, said boride and said oxide of said elements belonging to the groups 4a, 5a and 6a of the periodic table and Si,
   d) Al compounds,
   e) Al, and
   f) an iron family metal; and
   wherein from 20% to 50% of said boron nitride particles in an arbitrary region of said sintered body containing at least one hundred of said boron nitride particles are in surface-to-surface contact with each other.

2. The hard and tough sintered body in accordance with claim 1, wherein said boron nitride particles comprise cubic boron nitride particles.

3. The hard and tough sintered body in accordance with claim 2, wherein said cubic boron nitride particles make up from 87 vol. % to 90 vol. % of said sintered body.

4. The hard and tough sintered body in accordance with claim 1, wherein said boron nitride particles comprise cubic boron nitride particles having a mean particle diameter of not more than 20 µm, and wherein said sintered body has a strength characteristic such that a rectangular test piece of said sintered body 6 mm in length, 3 mm in width and 0.4 to 0.45 mm in thickness has a transverse rupture strength of not more than 20 kgf/mm$^2$ over a 4 mm test span, whereby said transverse rupture strength is measured after said rectangular test piece has been exposed to a fluoronitric acid solution in a closed vessel at 120 to 150° C. for 3 to 5 hours, wherein the fluoronitric acid solution has been prepared by mixing together 40 ml of double-diluted nitric acid having a concentration of 60 to 65% and 10 ml of hydrofluoric acid having a concentration of 45 to 50%.

5. The hard and tough sintered body in accordance with claim 4, wherein said transverse rupture strength is less than 10 kgf/mm$^2$.

6. The hard and tough sintered body in accordance with claim 4, wherein said transverse rupture strength is immeasurably low, because said rectangular test piece dissolves to a powder when exposed to said fluoronitric acid solution.

7. The hard and tough sintered body in accordance with claim 1, wherein said boron nitride particles comprise cubic boron nitride particles, wherein said coating binder essentially consists of an intermetallic compound of a (a) Al and (b) at least one of Ti, Zr and Hf, and wherein said additional binder comprises at least one of Al, Co, Ni, W, and WC.

8. The hard and tough sintered body in accordance with claim 1, wherein said boron nitride particles comprise cubic boron nitride particles, wherein said coating binder essentially consists of an intermetallic compound of (a) Al and (b) at least one of Ti, Zr and Hf, and wherein said additional binder comprises at least one material selected from a group consisting of (1) TiN, (2) ZrN, (3) HfN, (4) TiC, (5) ZrC, (6) HfC, (7) TiAlN, (8) solid solutions including at least one of TiN, ZrN, HfN, TiC, ZrC, HfC, and TiAlN, (9) Al, and (10) an Al compound.

9. The hard and tough sintered body in accordance with claim 1, wherein said coating binder respectively forms said coating homogeneously covering said boron nitride particles.

10. The hard and tough sintered body in accordance with claim 1, wherein said average thickness of said coating is in a range from 5 to 25 nm.

11. The hard and tough sintered body in accordance with claim 1, wherein said average thickness of said coating is in a range from 25 to 100 nm.

12. The hard and tough sintered body in accordance with claim 1, wherein said average thickness of said coating is in a range from 100 to 295 nm.

13. The hard and tough sintered body in accordance with claim 1, wherein said average thickness of said coating is in a range from 5 to 295 nm.

14. The hard and tough sintered body in accordance with claim 1, wherein said boron nitride particles comprise wurtzite boron nitride particles.

15. The hard and tough sintered body in accordance with claim 1, wherein from 20% to 29% of said boron nitride particles in said arbitrary region are in surface-to-surface contact with each other.

16. The hard and tough sintered body in accordance with claim 1, wherein from 40% to 50% of said boron nitride particles in said arbitrary region are in surface-to-surface contact with each other.

17. The hard and tough sintered body in accordance with claim 1, wherein said boron nitride particles have an average particle diameter of 10 to 15 µm.

18. The hard and tough sintered body in accordance with claim 1, wherein said boron nitride particles have an average particle diameter of 0.5 µm.

* * * * *